June 22, 1937.  T. W. RIEDER  2,084,502
AIRPLANE CONSTRUCTION
Filed April 24, 1936

INVENTOR
Thomas W. Rieder
By C. P. Byrnes
His attorney

Patented June 22, 1937

2,084,502

UNITED STATES PATENT OFFICE 2,084,502

AIRPLANE CONSTRUCTION

Thomas W. Rieder, Pittsburgh, Pa.

Application April 24, 1936, Serial No. 76,161

2 Claims. (Cl. 244—45)

This invention relates to an improved airplane construction, and more particularly, to an improved wing construction and/or body arrangement.

During recent years, the field of airplane design has to a great extent narrowed down to the monoplane and the biplane. In a commercial airplane of today, the need is for a fast or high speed plane that will carry more passengers and more payload in general, that will be relatively stable in the air, that can take off and land in a small space, and that has a high aerodynamic efficiency.

The monoplane is simpler in construction and more efficient aerodynamically than a biplane of equivalent load-carrying capacity, and as its resistance is less, it will fly with less power or attain a higher speed with the same power. But, the weight carrying ability of a monoplane is governed by its wing spread, and the latter, in turn, gives rise to landing gear problems.

On the other hand, a biplane can be made lighter and stronger and have less wing spread than a monoplane of equivalent payload carrying capacity. However, the biplane is not so efficient aerodynamically since there is an increased resistance to forward movement; and, if the upper wing plane or aerofoil is moved closer to the lower plane to decrease such resistance, the normal airstream flow over the top of the lower plane and under the bottom of the upper plane is disturbed and tends to offset desired aerodynamic action. On the other hand, if the spacing between wing planes is increased, the interplane struts and bracing wires increase parasitic resistance and the problems of positive and effective support for the wings arise.

And, in view of the above considerations, it has been an object of my invention to provide an airplane construction that will embody the advantageous features of the monoplane and of the biplane without their disadvantageous features.

Another object has been the provision of an improved airplane of multi-wing plane construction.

Another object has been the provision of an improved airplane having a high aerodynamic efficiency and/or a high lift efficiency.

A further object has been to more effectively utilize air currents set up by an airplane in movement.

These and other objects of my invention will appear to those skilled in the art from the description taken in view of the drawing and the claims.

Figure 1:
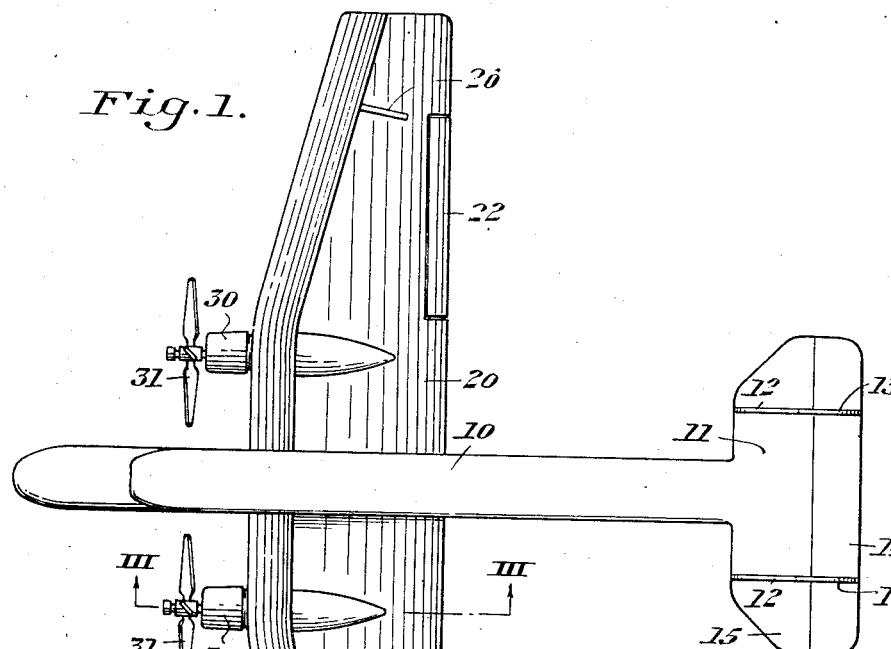
Figure 1 is a top plan of an airplane constructed in accordance with the principles of my invention.
Figure 3:
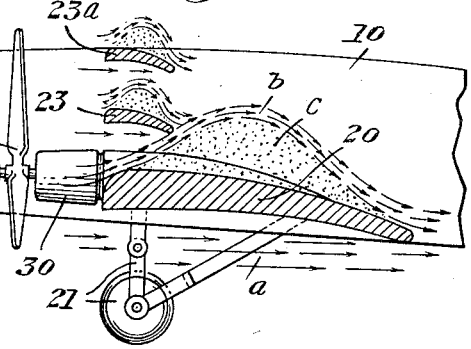
Figure 3 is a fragmental side section in elevation taken along the line III—III of Figure 1.
Figure 2:
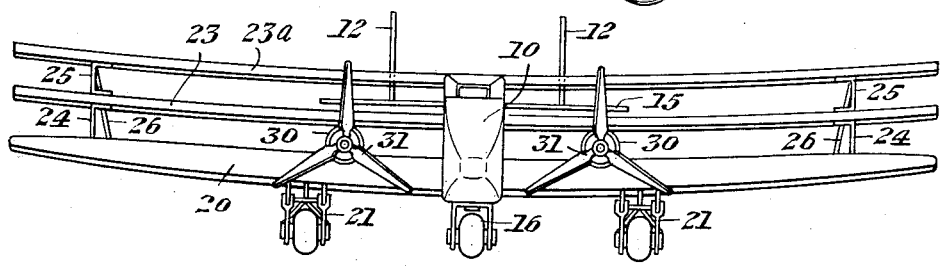
Figure 2 is a front view in elevation of the embodiment of Figure 1.

As seen by the dotted lines of Figure 3, I embody the advantageous features of both the biplane and the monoplane types of airplanes by providing narrow chord airfoils or auxiliary wing planes that are proportioned in height from the main wing as well as in width of chord with relation to that of the main wing, in such a manner that the main wing will effectively handle the airstreams in the usual manner of a monoplane. At the same time, this action will be supplemented by the independent and effective action of one or more auxiliary wing planes. These auxiliary wing planes are also located at least within, and preferably, slightly below the maximum height of the propeller tips, see Figures 2 and 3. In general, they are preferably mounted between horizontal planes taken through the upper and lower limits of the propellers. In this manner, the cylinder or cone (depending upon the speed of rotation) of air spirally in motion behind each propeller, will be utilized to increase the lifting action of the air stream which flows along the bottom of the wings of a plane during its movement through the air to produce a positive lift and of the air stream which flows over the top of the wings to rise in a hump and produce a suction lift, see Figure 3. In Figure 3, "$a$" represents the positive lift airstream flow along the bottom of a wing plane, "$b$" represents the suction stream flow over the top of a wing plane, and "$c$" represents the area of suction lift on the top of a wing plane.

Due to the construction and location of my auxiliary wing planes, I have been able to substantially retain the aerodynamic efficiency of a monoplane while materially increasing the lifting action, and while incorporating the load carrying ability of a biplane. Since the auxiliary planes are mounted relatively close to the main wing plane, I have also been able to simplify the strut mounting structure and to thus hold parasitic resistance down to a minimum. As shown, the auxiliary wing planes are centrally supported in the fuselage and are supported by a simple strut structure at either end.

The location of the auxiliary wing planes as well as their width of chord enables them to effectively utilize both the air currents set up by the movement of the airplane as well as the air currents set up by the propellers; a marked efficiency of operation results which offsets any normal decrease of efficiency that would follow from the use of more than one wing plane. However, as previously pointed out, I have so laid out and constructed the auxiliary wing planes of my invention that even this normal decrease of efficiency will not follow from their use.

As a result, I find that I am able to operate an airplane embodying the features of my invention at a higher rate of speed and at a higher over all efficiency for a given load than heretofore possible. It will also appear that by utilizing the above principles, I am able to provide an airplane whose speed is not sacrificed by reason of increased payload capacity.

In the drawing, a fuselage 10 extends fore and aft forming a cabin for the crew and passengers along its length and supporting a tail or empennage 11. The tail 11 includes a pair of vertical fins 12, a pair of rudders 13 pivoted thereto, an elevator 14, a stabilizer 15, and a tail skid wheel 16.

A main wing plane or aerofoil 20 extends dihedrally from opposite sides of the cabin 10 and carries a landing gear 21 and ailerons 22. A pair of superimposed auxiliary wing planes 23 and 23a also extend dihedrally from opposite sides of the cabin 10 with their leading edges substantially in vertical alignment with the leading edge of the main plane 20. Vertical struts 24 and 25 extend upwardly from plane to plane, connecting them together adjacent their outer ends, and an inclined strut 26 extends backwardly from the top end of each strut 25 to rest upon the main wing plane 20.

I have shown motor nacelles 30 and propellers 31 for pulling the airplane through the air. It should be here noted that my invention is not limited to an airplane having any particular number of motors or any special type of empennage 11.

I preferably provide a ratio of chord of auxiliary wing plane to main wing plane of one to four or less. Although a ratio of approximately one to two is the maximum, it is not recommended for best efficiency, since there will be a certain amount of disturbed area of air between wing planes. As seen from Figure 3, the airstream flowing up over the main wing 20 will not be disadvantageously disturbed by the lower surface of auxiliary plane 23 or by the airstream flow along its under surface. As long as the vertical distance between the auxiliary planes 23 and 23a is not much less than the chord of the lower plane 23, both planes will function as efficient, independent airfoils and will materially increase the stability as well as the lift of the airplane; a substantially one to one ratio is a good working value in this connection.

Since the auxiliary planes 23a and 23 are mounted within and below the cylindrical plane formed by the rotation of the propellers, the spiral stream of air set in motion by the propellers in pulling the machine through the air augments the air streams set up by the cutting movement of the wing planes and further increases the resultant lift action.

Although, in the preferred form of my invention shown in the drawing, the angle of incidence of the auxiliary planes is five degrees (5°) and of the main wing plane is about two or three degrees (2 or 3°), these values may be changed as desired within reasonable limits and there need not necessarily be a decalage between the angle of the auxiliary planes and the angle of the main wing plane. The values and proportions previously set forth are suitable for the present day leading edge curvatures and angle of incidence values of wing planes and can be changed in accordance with the principles of my invention in case of unusual situations. That is, the first auxiliary plane should have a chord width such that when it is spaced from the main wing plane a distance substantially equal to such width, that a substantially normal airstream suction hump will form on the upper surface of the main wing plane without interference from the auxiliary plane or its airstreams. When more than one auxiliary wing plane is used, the spacing between them should be also proportioned to the chord widths in such a manner that the flow over the lower auxiliary plane will be substantially normal and free from interference. It will, of course, appear that although it is preferable to mount the leading edges of the auxiliary wing planes in substantial vertical alignment with the leading edges of the main wing plane, the auxiliary planes may be staggered forwardly of the main wing plane.

Although the draftsman has shown the suction lift "c" and the airstream or suction flow "b" further forward of the main wing plane 20 than is actually the case for the proportions employed, the showing is sufficient to set forth the principles involved.

While I have described my invention by means of an illustrative embodiment, it will be apparent that many changes, substitutions, omissions, or combinations thereof may be made in this application without departing from the spirit and scope of the invention as indicated by the appended claims.

I claim:

1. In an airplane construction having a fuselage, a main wing extending on opposite sides of the fuselage, a plurality of motor nacelles mounted on said main wing at spaced positions thereon, propellers operatively positioned forwardly of said nacelles for driving the airplane, at least one auxiliary wing plane mounted above said main plane and spaced therefrom, said auxiliary plane having a chord width of substantially a quarter of the chord width of said main plane such that a substantially normal airstream hump will form on an upper surface of said main wing plane, the spacing between said auxiliary and main planes being such that the auxiliary plane will have a height such that its top surface will be below a horizontal plane taken along the upper limit of travel of the tips of said propellers, the arrangement being such that said main wing plane will handle the airstreams in the usual manner of a monoplane.

2. In an airplane construction having a fuselage, a main wing extending on opposite sides of the fuselage, a motor nacelle mounted on said main wing at spaced positions thereon, a propeller operatively positioned forwardly of said nacelle for driving the airplane, at least one auxiliary wing plane mounted above said main plane and spaced therefrom, said auxiliary plane having a chord width of not more than half the chord width of said main plane, such that a substantially normal airstream hump will form on an upper face of said main wing plane, the spacing between said main planes being such that the auxiliary plane will have a height such that its top surface will be below a horizontal plane taken along the upper limit of travel of the tips of said propellers, the arrangement being such that said main wing plane will handle the airstreams in the usual manner of a monoplane.

THOMAS W. RIEDER.